(12) United States Patent
Simpson et al.

(10) Patent No.: US 6,967,736 B2
(45) Date of Patent: **\*Nov. 22, 2005**

(54) MEDIATED PRODUCTION DEVICE ACCESS IN A DISTRIBUTED ENVIRONMENT

(75) Inventors: Shell Sterling Simpson, Boise, ID (US); Garth Frederick Schmeling, Boise, ID (US); Kenneth Lee Oakeson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 942 days.

This patent is subject to a terminal disclaimer.

(21) Appl. No.: 09/885,324

(22) Filed: Jun. 19, 2001

(65) Prior Publication Data

US 2002/0191212 A1    Dec. 19, 2002

(51) Int. Cl.[7] ............................................. G06K 15/00
(52) U.S. Cl. ..................................... 358/1.15; 358/1.18
(58) Field of Search ......................... 358/1.1, 1.6, 1.11, 358/1.13, 1.15, 1.18

(56) References Cited

U.S. PATENT DOCUMENTS 6,453,127 B2 * 9/2002 Wood et al. ................... 399/8

* cited by examiner

Primary Examiner—Arthur G. Evans

(57) ABSTRACT

Mediating access to production devices. A method embodying the invention includes acquiring an access request for a production device and then retrieving an interface for the production device, the interface having user accessible controls for selecting production options for a document. Production options selected through the interface along with instructions for accessing the document are returned to the production device.

29 Claims, 7 Drawing Sheets

| PRODUCTION MANAGER | | | | |
|---|---|---|---|---|
| Document Name | Device | Status | Owner | Progress |
| Story | Printer A | In Progress | Joe | 15 of 18 pgs. |
| Story | Binder | Pending | Joe | |
| Brochure | FAX | In Progress | Sue | 7 of 9 pgs. |
| Brochure | E-mail | Sent | Sue | 9 of 9 pgs. |
| Catalog | Printer B | Doc. Jam | Al | 8 of 16 pgs. |

[Pause] 98  [Delete] 100  [Redirect] 102

MEDIATED PRODUCTION DEVICE ACCESS IN A DISTRIBUTED ENVIRONMENT

FIELD OF THE INVENTION

The present invention is directed to a method and system for electronic document production. More particularly, the invention is directed to a method and system for mediating access to production devices in a distributed environment.

BACKGROUND OF THE INVENTION

In a basic desktop computing environment, a printer or other production device is connected directly to a computer. Production devices include printers; finishers such as a binder, sorter, or folder; e-mail clients; facsimile devices; web server; and electronic data storage devices. However, production devices are not limited to those listed but may include any device capable of electronically or physically saving, displaying, formatting, or transferring a target document. To produce a document, a user either opens or creates an electronic document using a word processor or other application. The user then issues a production request for a selected production device. A driver, specific to the selected production device—a printer in this example—generates a user interface allowing the user to select options for formatting the document. Among others, these options can include the number of copies, print resolution, specific paper source and output bins. With the desired production options selected, the driver formats the production request into a specialized series of commands directing the printer to produce the document on one or more sheets of paper. To add a new production device, the user simply connects the new device and installs the new driver for that device on the computer.

In a more complex environment, the computer and production devices are components of a larger network of electronic devices. A number of network users can share a common production device such as a printer. Using device management software application, a system administrator is able to manage and limit access to that printer. While new printers and other production devices can be easily connected to the network, drivers for those devices must be individually installed on each client computer that accesses the new device. As updates for the device drivers become available, the updates must also be installed on each client computer.

With the ever-expanding resources provided by the Internet, document production has taken a dramatic step forward. Becoming more autonomous, production devices are being designed to connect directly to and communicate over the Internet. Rather than being controlled by a device driver installed on a desk-top computer or separate print server, these new production devices contain their own programming.

In one new system, a client computer, utilizing a web browser rather than a particular device driver, accesses a web server embedded in a production device such as a printer. Representing that device on the network, the embedded web server allows the device to be connected directly to the network rather to another device such as a desktop computer. When accessed by a browser, the embedded web server returns a web page containing controls for formatting and printing a selected document. With the document and desired format options selected, the browser returns the document and the user's formatting instructions to the embedded web server, which, in turn, self-manages production of the document on the device.

In another new system, the client computer, using a browser, accesses a print service—a web site hosted by a server computer. The print service presents the user with a selection of printers from which to choose. The browser returns the user's printer selection along with the location of the components of the document to be printed. For example, the text of the document may be located in one location on the network while the color graphics for a cover page may be located elsewhere. The print service then directs the web browser to a server embedded in or otherwise representing the selected printer. That web server returns a web page allowing the user to select formatting options for the document. With the options selected, the print service compiles the document's components and delivers them along with the selected formatting options to the web server representing the selected production device.

Generally, these new systems are designed to eliminate the need for centralized device management. However, as it is with conventional document production, it is desirable, if not essential, in some cases to provide some centralized control over a group of production devices. Centralized control is useful to mediate access to a particular device and to provide temporary storage for production data sent to each device. For example, a professional printing business may provide access to a group of production devices over the Internet. That business, however, may desire to limit access to those devices to a group of specified customers. Moreover, production devices such as printers are capable of printing one document at a time. Where multiple requests are simultaneously directed to a single production device, the business may desire to temporarily store each successive request in a central queue releasing the request one at a time as the production device becomes available. Consequently, what is needed is a method for centrally managing and mediating access to production devices within these new systems for document production.

SUMMARY OF THE INVENTION

Accordingly, the present invention involves mediating access to production devices. A method embodying the invention includes acquiring an access request for a production device and then retrieving an interface for the production device, the interface having user accessible controls for selecting production options for a document. The interface is presented to a client. Production options selected through the interface along with instructions for accessing the document are returned to the production device.

DESCRIPTION OF THE DRAWINGS

FIG. 7 is an exemplary interface for managing the queue.

DETAILED DESCRIPTION OF THE INVENTION

Figure 1:
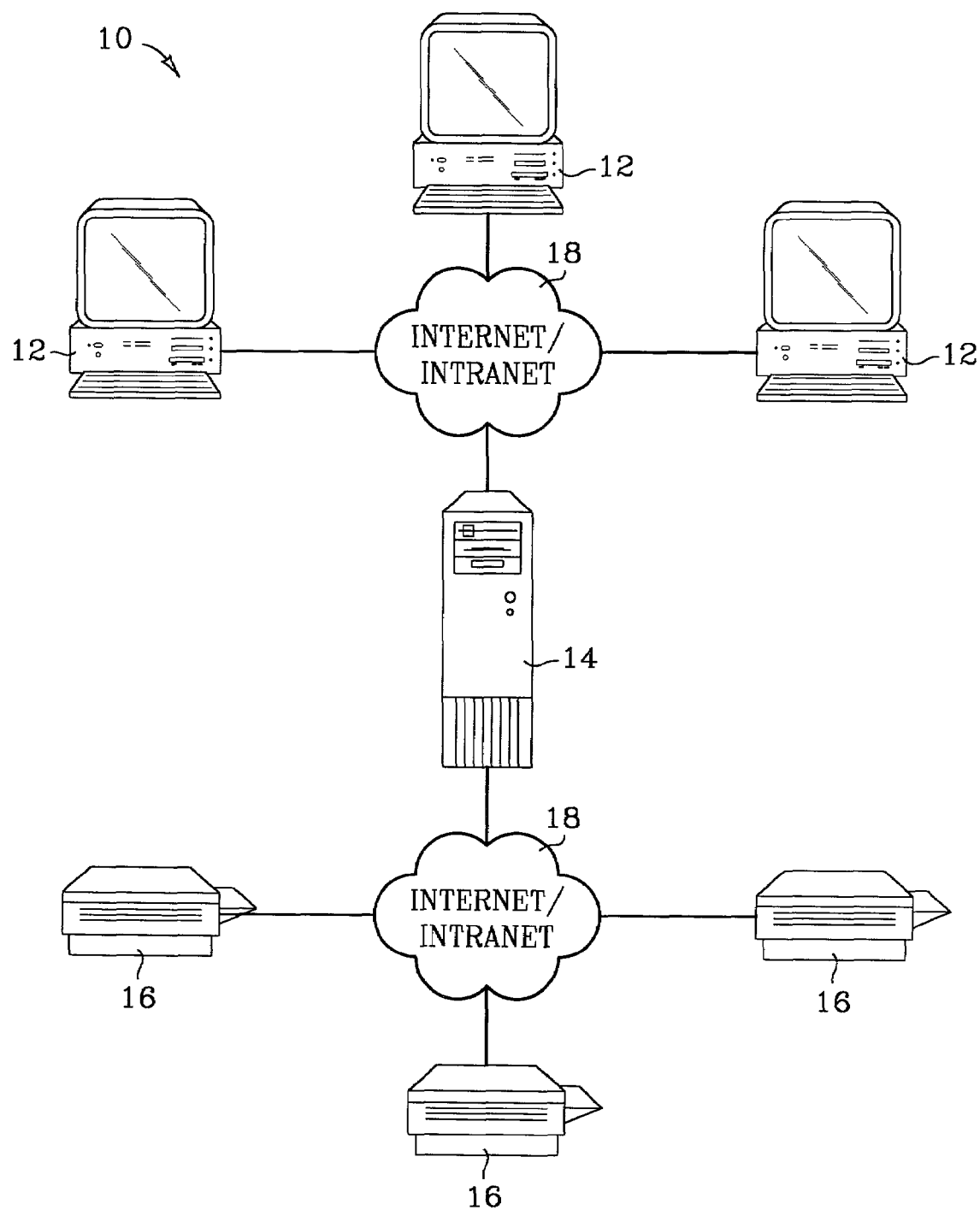
FIG. 1 is a schematic representation of a computer network that includes several client devices, a server device, and several production devices.

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client—Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for delivering requested information back to the client. In any given network there may be multiple clients and multiple servers. A single device may contain programming allowing it to operate both as a client device and as a server device. Moreover, a client and a server may both operate on the same device.

Interface: The junction between a user and a computer program providing commands or menus through which a user communicates with a program. The term user in this context represents generally any person or mechanism desiring to communicate with the program. For example, in the client-server model defined above, the server usually generates and delivers to a client an interface for communicating with a program operating on or controlled by the server device. Where the server is a web server, the interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

INTRODUCTION: In a new model for network document production, a user identifies and provides a self-representing production device access to a target document. A target document is an electronic document selected for production. A target document may comprise two or more components. For example, the document's text may be stored in one electronic file while the document's graphics are stored in another. Each component may be stored on a different network device. The term store should be taken liberally. A network device that "stores" a component may not actually store anything, but will be capable of servicing requests related to the "stored" item. To identify the target document, a user need only locate the target document's components and provide instructions on accessing those components. A self-representing production device has the ability, without the aid of a second device, to communicate over a network and produce a target document upon request. For example, a production device such as a conventional printer is incapable of self-representation and must be connected to and controlled by a second device such as a desktop computer or a print server. A self-representing device typically contains a production server facilitating network communication and managing document production.

To utilize a self-representing device, a user sends a request to access (an "access request") a production server operating on the device selected to produce the target document. The production server returns a user interface allowing the user to select production options for the target document. A production device such as a conventional printer usually provides only one service, printing. Other production devices provide multiple services. A single device may be able to provide printing, copying, scanning, and facsimile services. For each service, there may exist a number of production options. For example, when printing a document, options can include duplexing, landscape or portrait orientation, and finishes such as stapling or sorting. The instructions for accessing the target document along with selected production options are returned to the production server, which, in turn, retrieves the target document and manages its production in accordance with the selected options.

It is expected that by providing a mediation service, embodiments of the invention will allow centralized management of the production devices within this new model.

Although the various embodiments of the invention disclosed herein will be described with reference to the computer network 10 shown schematically in FIG. 1, the invention is not limited to use with network 10. The invention may be implemented in or used with any computer system in which it is necessary or desirable to produce electronic documents. The following description and the drawings illustrate only a few exemplary embodiments of the invention. Other embodiments, forms, and details may be made without departing from the spirit and scope of the invention, which is expressed in the claims that follow this description.

Referring to FIG. 1, network 10 represents generally any local or wide area network in which a variety of different electronic devices are linked. Network 10 includes client devices 12, typically personal computer workstations. However, client device 12 represents generally any device, a personal digital assistant for example, capable of displaying a user interface. Network 10 also includes server device 14 and production devices 16. While shown as printers, production devices 16 represent any production device present on network 10. While capable of other functions, server device 14 need only facilitate communication between client devices 12 and production devices 16.

Communication link 18 interconnects client devices 12, server 14, and production devices 16. Communication link 18 represents generally a cable, wireless, or remote connection via a telecommunication link, an infrared link, a radio frequency link, or any other connector or system that provides electronic communication between devices 12, 14, and 16. Communication link 18 may represent an intranet, an Internet, or a combination of both. The path followed by link 18 between devices 12, 14, and 16 in the schematic view of FIG. 1 represents the logical communication path between these devices, not necessarily the physical path between the devices. Devices 12, 14, and 16 can be connected to the network at any point and the appropriate communication path established logically between the devices.

Figure 2:
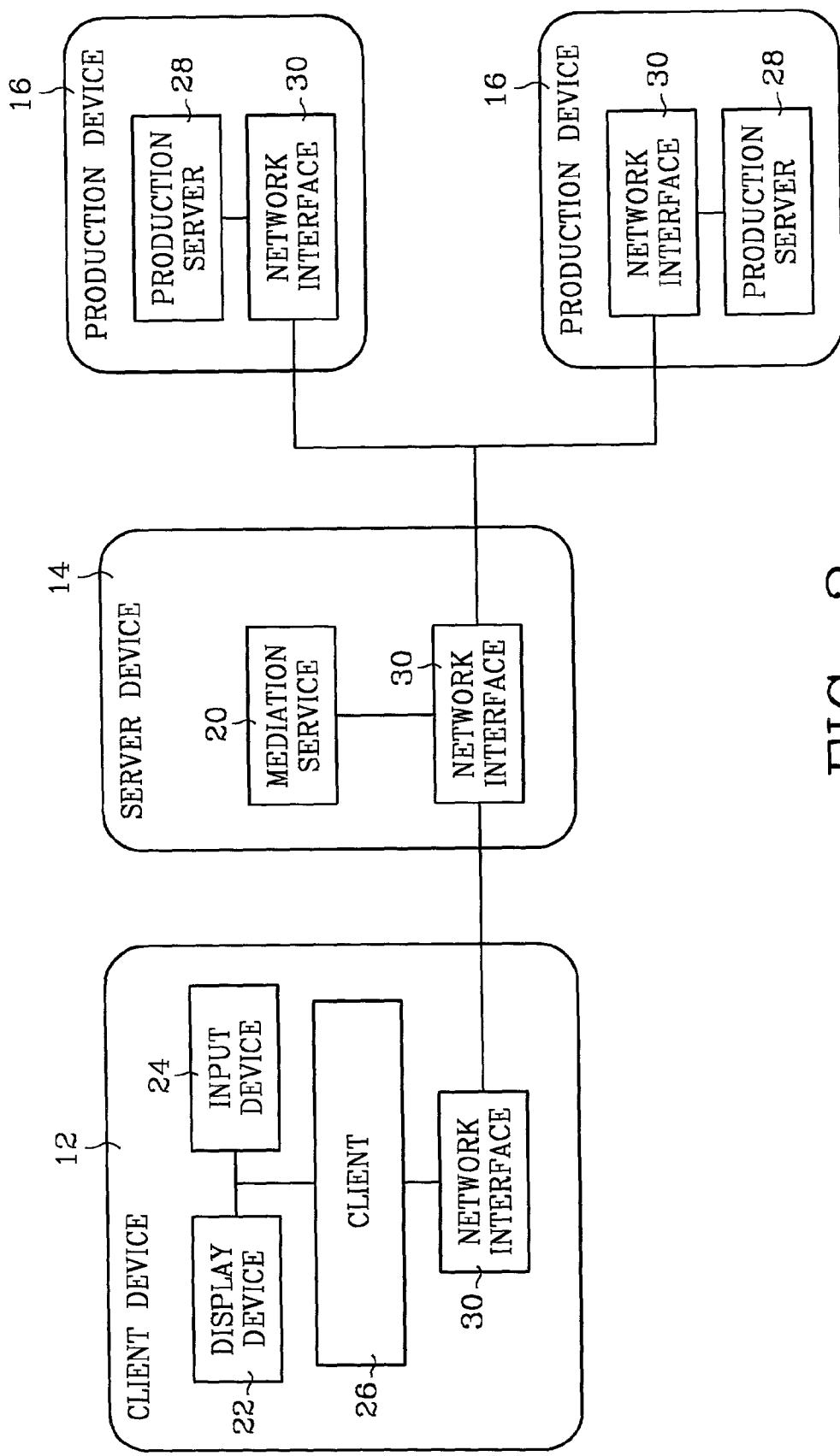
FIG. 2 is a block diagram of the network of FIG. 1 in which the invented mediation service is embodied in a program running on the server device according to one embodiment of the present invention.

COMPONENTS: The logical components of one embodiment of the invented document production system will now be described with reference to the block diagrams of FIGS. 2–4. In FIG. 2, the invention is embodied in software or other programming, described in more detail below, labeled mediation service 20 operating on server device 14. Mediation service 20 represents generally any programming capable of mediating network communication between client devices 12 and production devices 16. Client device 12 provides a mechanism for presenting a user with an interface for managing document production on production devices 16. Client device 12 usually includes a monitor or other suitable display device 22 and a keyboard and/or a pointing device such as a mouse or other suitable input device 24. Client 26 is a program for causing display device to display a desired interface and for delivering instructions to mediate access to service 20. Consequently, while client device 12 is illustrated as a device separate from server device 14 and production devices 16, the function of client device 12, specifically client 26, can be incorporated into any network device capable of providing a user interface, which may include devices 14 and/or 16. While FIG. 2 illustrates mediation service 20 operating on server device 14, it may just as well operate on production devices 16 or client device 12. Production devices 16 are self-representing, each containing a production server 28. Production servers 28 represent generally any programming capable of providing an interface for selecting production options and then managing production of a document using production options selected through that interface. To facilitate network communication between devices 12, 14, and 16, each includes network interface 30.

Figure 3:
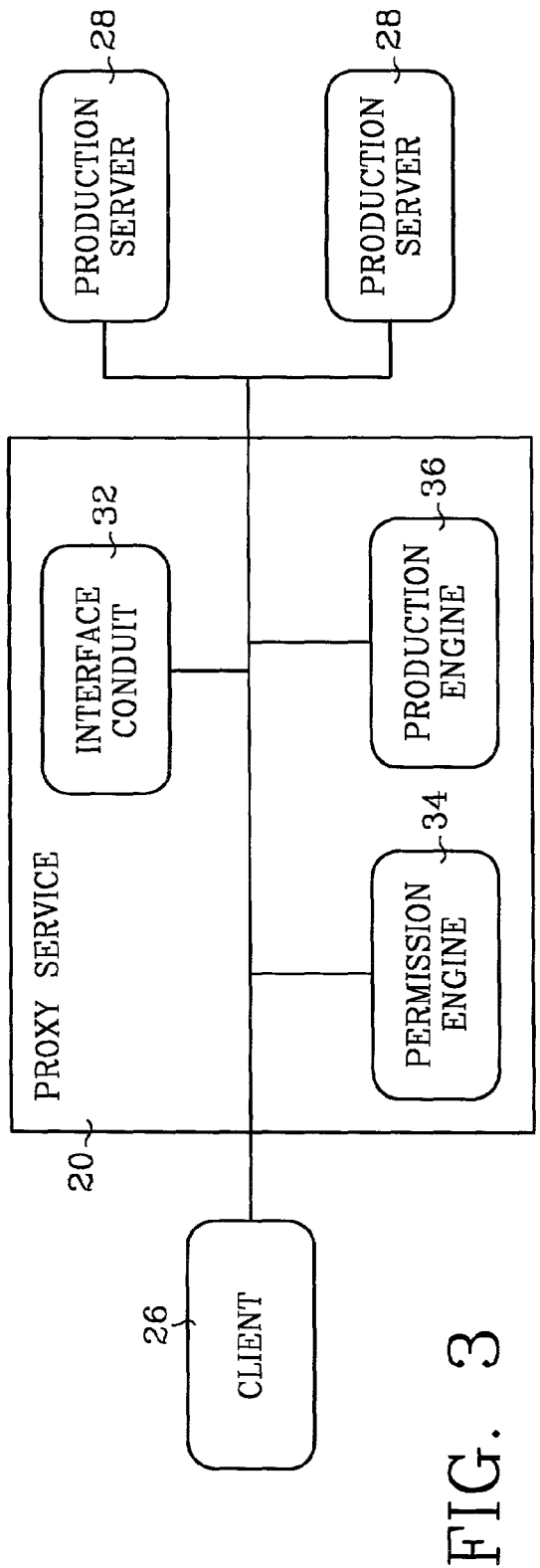
FIG. 3 is a block diagram further illustrating the logical components of the mediation service according to one embodiment of the present invention.

Referring now to FIG. 3, mediation service 20 includes interface conduit 32, permission engine 34, and production engine 36. Interface conduit 32 represents generally any programming capable of acquiring an access request generated by client 26 and directed to a particular production server 28, acquiring an interface from that production server 28, and returning the interface to client 26. The interface, usually displayed by client 26, may include controls for selecting a particular document as a target document, or a target document may have been previously identified by the user. Permission engine 34 embodies generally any programming capable of verifying credentials for accessing a particular production device 16. Credentials can be a user name and password, a digital badge, or any other code identifying a particular user or device. Production engine 36 represents generally any programming capable of managing the delivery of production options selected through the interface along with the target document or instructions for accessing the target document to production server 28.

It is envisioned that production servers 28 will be web servers and that client 26 will be a web browser. A web server is a program that hosts documents, commonly referred to as Web pages, for remote retrieval over a network such as the World Wide Web. Usually, a web server functions as software operating on a network computer, but can be firmware embedded into production devices 16. Web pages can be delivered in a number of formats including, but not limited to, HTML (Hyper-Text Markup Language) and XML (eXtensible Markup Language). The web pages may be generated on demand using server side scripting technologies including, but not limited to, ASP (Active Server Pages) and JSP (Java Server Pages). A web browser is a client program for requesting and displaying web pages.

Using HTML (hyper-text mark up language) and/or another internet language, production servers 28 each create an interface in the form of a web page having an assigned network address. The network address is usually in the form of an URL (Uniform Resource Locator) or IP (Internet Protocol) address. Beneficially, this allows cross platform communication. For example, production servers 28 may be functioning under one operating system such as Linux® while client device 12 may be running Microsoft® Windows®. To allow mediation service 20 to exclusively control network communication with production servers 28, it is envisioned that the network address for the web page for each production device 16 will be directly accessible only by mediation service 20. For example server device 14 and production servers 28 may be placed on a common subnet, and the IP address assigned to each production server may be accessible only on that subnet. As another example, production server 28 might only generate an interface when requested by mediation service 20. Production server 28 could distinguish mediation service 20 from other requesters by IP address, password, or any other means of identification.

Where client 26 is a web browser, client 26 may issue an access request for a production device 16 using any number of methods. In one embodiment, client 26 browses directly to the network address associated with the web page for a selected production device 16. Interface conduit 32 acquires the access request by monitoring and intercepting network communication directed to device 16. In another embodiment, rather than being intercepted, access requests for a specified production device 16 are redirected to interface conduit 32. In one example, the web page for device 16 includes instructions for redirecting client 26 to interface conduit 32. For example, the web page for a particular production device 16 is associated with the URL—"http://printer.company.com." Mediation service 20 is accessed through the URL—http://mediation.company.com. When issuing an access request, client 26 browses to http://printer.company.com. The production server 28 for the selected device 16 returns a web page redirecting client 26 to the URL—http://mediation.company.com/ref?device=http://printer.company.com. In this manner, interface conduit 32 is able to later access the URL for the selected production device 16 which is indicated following the "ref?device=" portion of the above URL.

In a second example, a directory service is used. The term directory service embodies generally any programming capable of providing a listing of available production devices and instructions for accessing those devices. The directory service may be located on server device 14 but need only be accessible by client 26. To issue an access request, client 26 browses to the directory service, which returns an interface for selecting a production device. When production device 16—access to which is controlled by mediation service 20—is selected, the directory service redirects client 26 to interface conduit 32 providing interface conduit 32 with the identity of the selected production device 16. For example, the interface produced by the directory service may include a link to each production device. For production device 16 controlled by mediation service 20, that link is a link to mediation service 20 with a reference to the address of production device 16. Using the exemplary URLs from above, the link would be "<a href="http://mediation.company.com/ref?device=http://printer.company.com">."

Once interface conduit 32 acquires the access request, permission engine 34 acquires credentials for the user or device issuing the access request. To streamline authentication, the credentials may take the form of a cookie. Alternatively, permission engine 32 may present client 26 with an interface having user accessible controls for entering or otherwise providing a user's credentials. Permission engine 32 then verifies those credentials comparing them against a database containing the credentials for a list of approved users or approved devices. Other authentication schemes are envisioned and are within the scope of this application, including, but not limited to, public key authentication schemes that use certificates rather than passwords. The credentials database may be a component of permission engine 32. Or, it may be located elsewhere on server device 14 or anywhere else accessible by permission engine 32. If the credentials are not verified, the interface for the specified production device is not provided to client 26.

Figure 4:
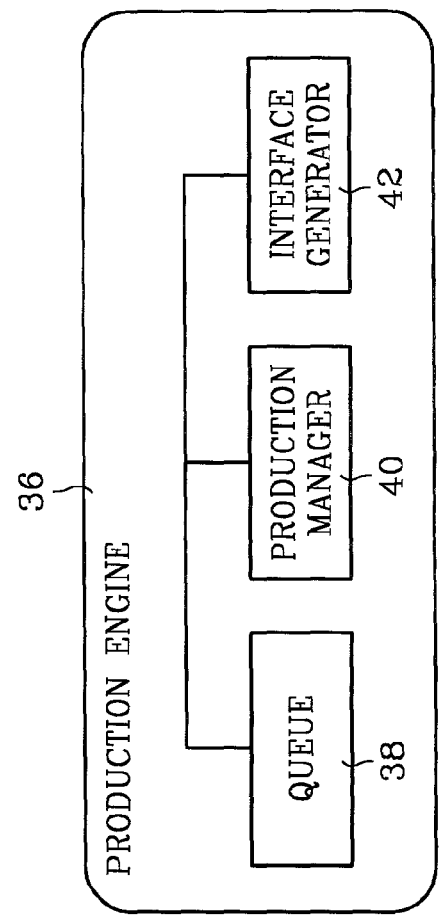
FIG. 4 is a block diagram further illustrating the logical components of the production engine according to one embodiment of the present invention.

As illustrated in FIG. 4, production engine 36 includes queue 38, production manager 40, and interface generator 42. Production devices such as printers are capable of producing one document at a time and occasionally malfunction. Queue 38 is an electronic holding bin allowing production engine 36 to manage production data directed to a busy or malfunctioning device. Production data, usually provided by client 26, represents generally production options selected for a target document as well as the target document itself or instructions for accessing the target document. Production manager 40 represents generally any programming capable of administering the production data within queue 38. Upon receipt of production data from client 26 for a target document, production manager 40 places the production data in queue 38. Production manager 40 tracks the status of each production device 16 and provides interface generator 42 with the information required to generate an interface for displaying the status of the production data in queue 38 as well as user accessible controls for directing how production manager 40 manipulates that production data. As production device 16 becomes available, production manager 40 releases production data from queue 38 for one target document at a time. It is envisioned that the interface for a selected production device 16 will include instructions directing client 26 to deliver production data to mediation service 20. Those instructions may also direct client 26 to provide mediation service 20, specifically production manager 40, with directions for ultimately delivering the production data to the selected production device 16.

The block diagrams of FIGS. 1–4 show the architecture, functionality, and operation of one implementation of mediation service 20. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, mediation service 20 can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain mediation service 20 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 5:
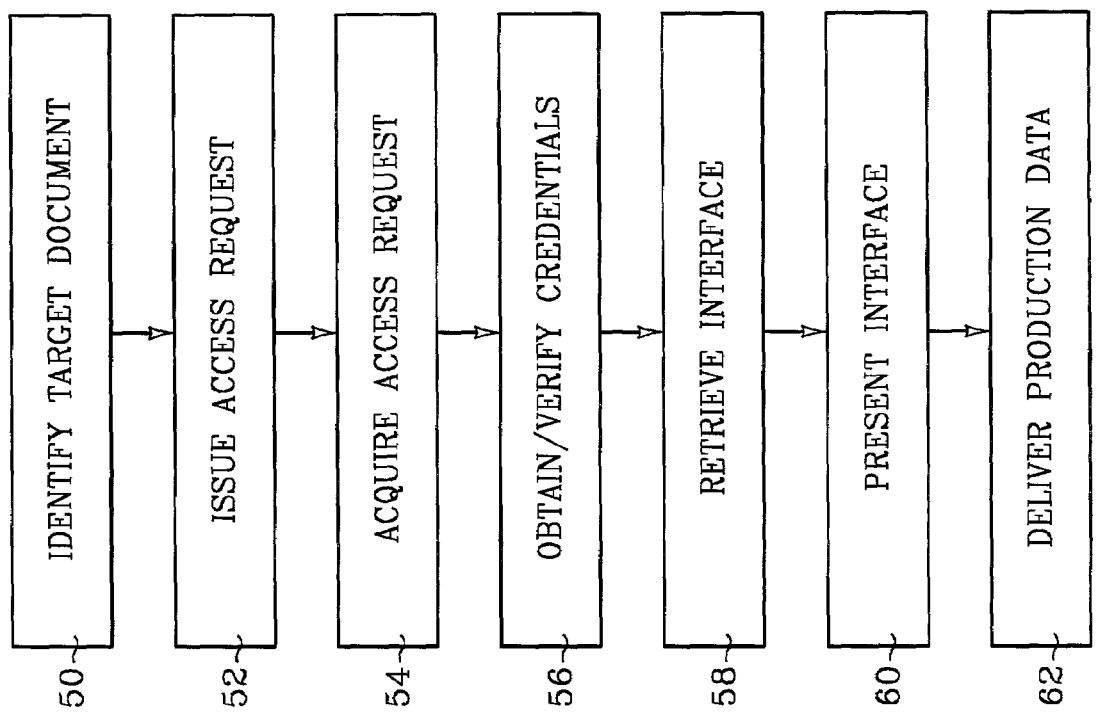
FIG. 5 is a flow diagram illustrating the document production process provided by the mediation service according to one embodiment of the present invention.
Figure 6:
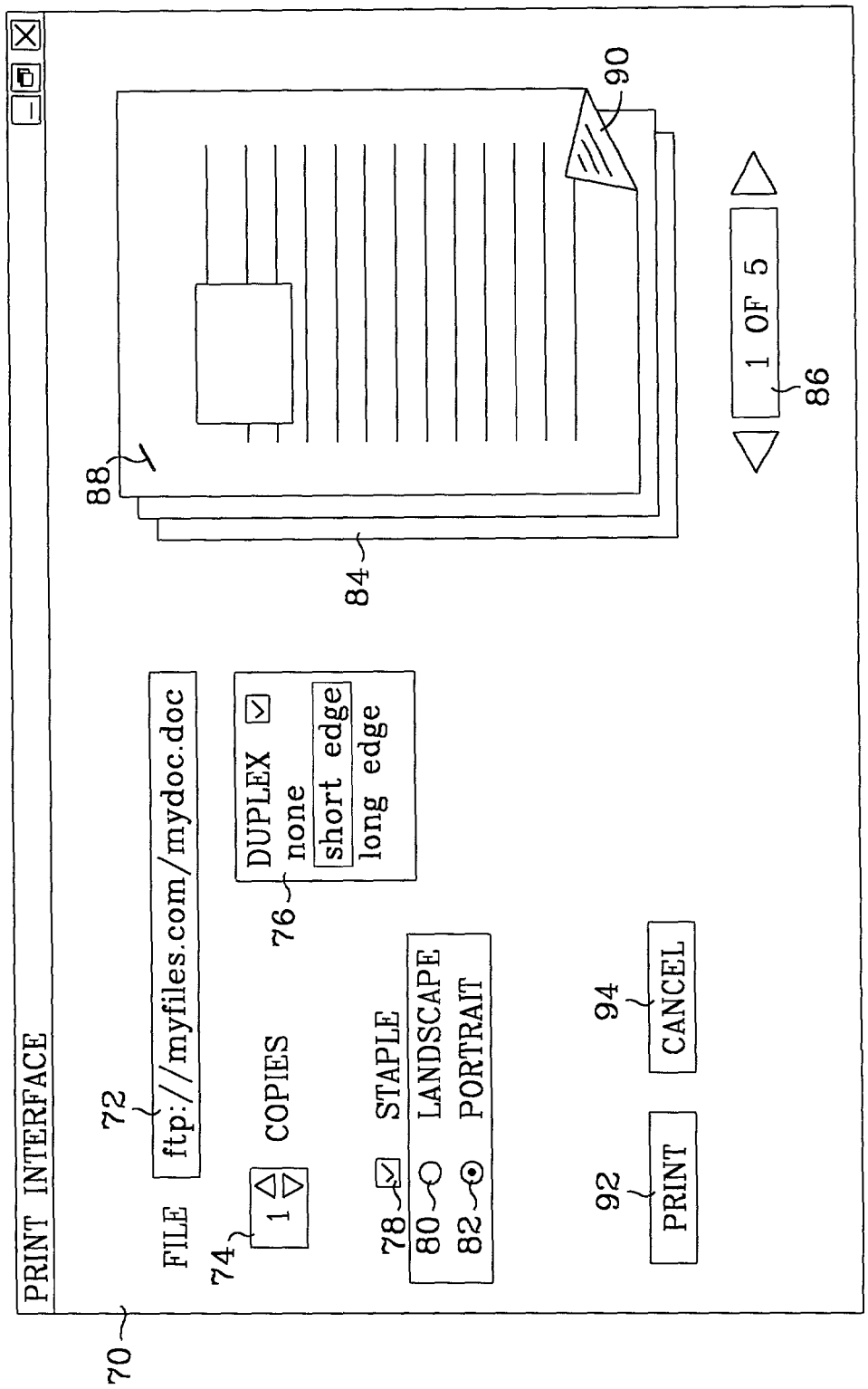
FIG. 6 is an exemplary screen view of an interface for selecting production options.
Figure 8:
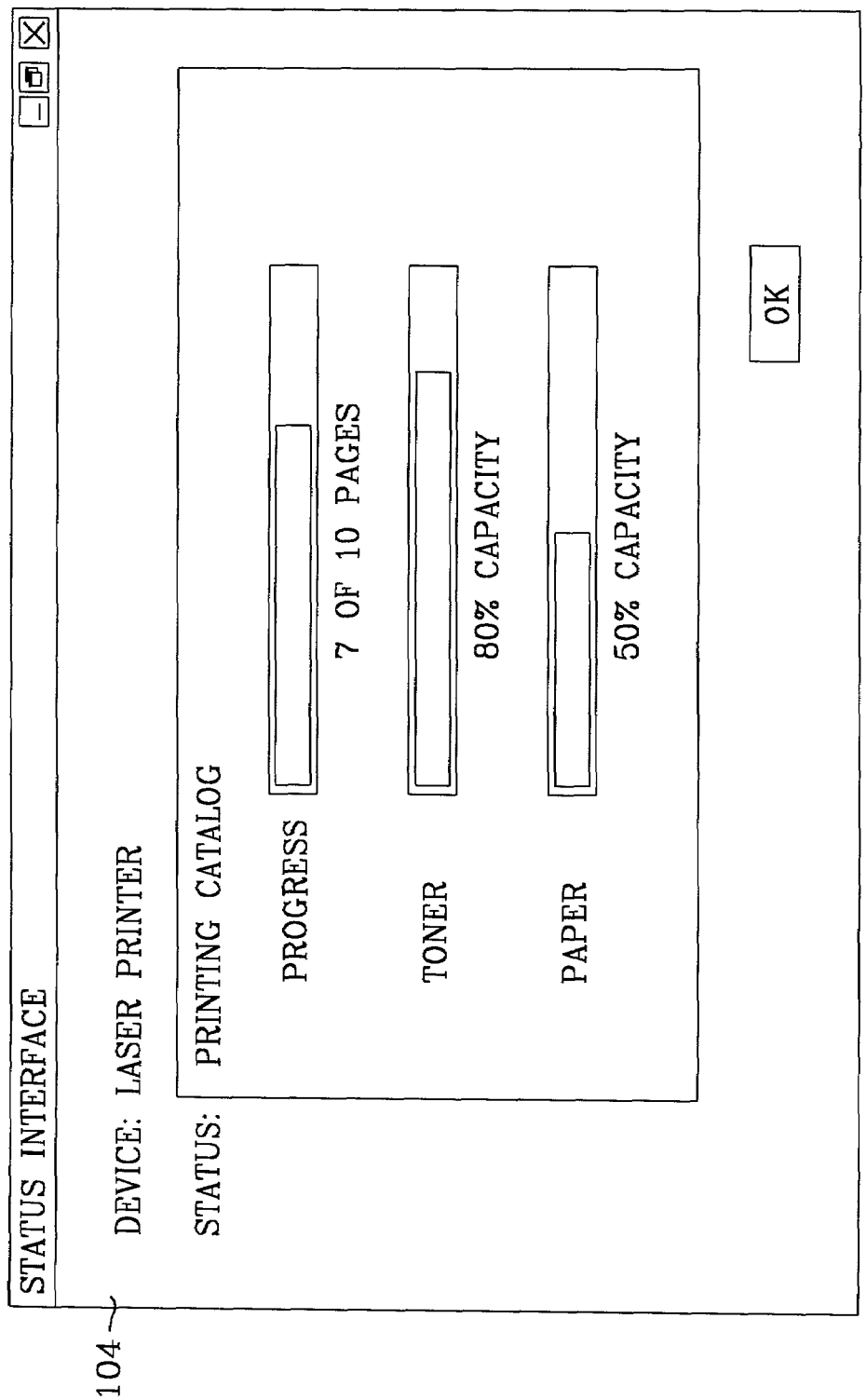
FIG. 8 is an exemplary interface for providing device status.

OPERATION: The operation of mediation service 20 will now be described with reference to the flow diagram of FIG. 5 and the exemplary screen views of FIGS. 6–8. FIG. 5 provides an example of the steps taken to produce a document using mediation service 20. FIG. 6 illustrates a sample interface for a printer. FIG. 7 illustrates a sample production management interface, while FIG. 8 shows a sample device status interface.

Beginning with FIG. 5, using client 26, a target document is identified (step 50). Client 26 issues an access request for one production device 16 (step 52). Interface conduit 32 acquires the access request (step 54) and verifies credentials for accessing that production device 16 (step 56). Once verified, interface conduit 32 provides client 26 with the interface for production device 16 (step 58). Production engine 36, then, delivers the production data selected through the interface to production device 16 as that device becomes available (step 60).

Interface conduit 32 may accomplish step 54 by monitoring and intercepting network communication directed to production device 16. It is envisioned, however, that step 54 will be accomplished by redirecting client 26 to mediation service 20. Redirection may be facilitated by production device 16 or by a directory service that provides network addresses for accessing production devices 16. In the first scenario, client 26 browses to the network address for the web page of a selected production device 16. That web page contains instructions redirecting client 26 to mediation service 20. In the second scenario, to issue an access request, client 26 browses to a web page for a directory service. From that web page, the desired production device 16 is selected and client 26 is redirected to mediation service 20.

The delivery of production data in step 60 may be accomplished in a similar manner. The web page for a selected production device 16 may include instructions directing client 26 to deliver chosen production data directly to mediation service 20. Although initially received and held by mediation service 20, that production data would include instructions specifying the selected production device 16 providing production manager 40 with the ultimate destination of the production data.

It may be desirable or necessary in some cases to present client 26 with more than one interface in step 58 before all production data can be delivered in step 60. For example, the number of production options available for a selected production device 16 may require more controls than can be displayed on one screen. The device 16 may provide advanced production options that users generally do not access. In these situations, step 58 involves providing client 26 with an initial interface. The initial interface includes controls or other means for requesting each subsequent interface. For example, once a user has selected the desired production options on the initial interface, the user may select a control to access a subsequent interface for selecting advanced production options. It is envisioned, then, that the initial and each subsequent interface provided to client 26 will include instructions to deliver production data directly to mediation service 20 along with instructions providing production manager 40 with the ultimate destination of the production data.

FIG. 6 illustrates a screen displaying a production interface for a printer as presented in step 60 of FIG. 5. In this example, interface 70 includes control 72 for identifying the target document. Control 74 allows the user to select the number of copies to be printed. Controls 76 through 82 are radio buttons allowing the user to select options such as duplexing, stapling, and landscape or portrait orientation. Control 84 provides a print preview for the document allowing the user to visualize the document before printing. Where the document contains multiple pages, control 86 to scroll through and preview each page. Print preview control 84 also reflects selected production options. Icon 88 shows that staple control 78 has been selected. Icon 90 shows that duplex control 76 has been selected. With the desired options selected, the user can then select print control 92 or may select cancel control 94.

FIG. 7 illustrates a screen displaying an interface for managing the production data in queue 38. In this example management interface 96 displays the status of each set of production data held in queue 38 as well as user accessible controls for directing how production manager 40 manipulates that production data. Here, production management interface 96 displays the status of three sets of production data—Story, Brochure, and Catalog. Story is to be produced on Printer A and then bound. Brochure is to be delivered via fax and electronic mail. Catalog is to be produced on Printer B. Interface 96 includes manipulation controls 98, 100, and 102 for controlling each set of production data. For example, interface 96 shows that Printer B is malfunctioning. Highlighting catalog and then selecting redirect control 102 allows the production data to be delivered to a functioning printer.

FIG. 8 illustrates a screen displaying an interface for providing the status of a production device 16. In this example, status interface 104 is for a particular laser printer. In this example, status interface 104 provides information on the target document being printed as well as data concerning the printer's consumables.

Although the flow chart of FIG. 5 shows a specific order of execution, the order of execution may differ from that which is depicted. For example, the order of execution of two or more blocks may be scrambled relative to the order shown. Also, two or more blocks shown in succession in FIG. 5 may be executed concurrently or with partial concurrence. All such variations are within the scope of the present invention. The screen displays of FIGS. 6–8 are exemplary only. There exist many possible layout and control configurations for interfaces that will allow a user to select available production options, manage production data, and view device status. FIGS. 6–8 each merely provide one example.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for mediating access to production devices, comprising:
   acquiring an access request for a production device;
   retrieving an interface from the production device, the interface having user accessible controls for selecting production options for a document;
   presenting the interface to a client; and
   returning production data to the production device, the production data including production options selected through the interface and instructions for accessing the document.

2. The method of claim 1, wherein the act of acquiring comprises intercepting an access request directed to the production device.

3. The method of claim 1, wherein the act of acquiring comprises acquiring a redirected access request.

4. The method of claim 1, wherein the acts of acquiring and retrieving are performed on a network device other than the selected production device.

5. The method of claim 1, further comprising, before the act of returning, placing the production data in a queue, and wherein the act of returning comprises returning the production data from the queue.

6. The method of claim 5, further comprising providing an interface having user accessible controls for managing production data in the queue.

7. The method of claim 1, further comprising providing an interface having controls for displaying the status of the production device.

8. The method of claim 1, further comprising obtaining and verifying credentials and wherein the act of presenting comprises presenting the interface only upon verification of the credentials.

9. The method of claim 8, wherein the client is a web browser and the act of obtaining comprises obtaining credentials using a cookie provided by the web browser.

10. The method of claim 1 wherein the act of retrieving comprises retrieving the interface in the form of a web page and the act of presenting comprises presenting the web page to a web browser.

11. A method for mediating access to production devices, comprising:
   acquiring a client's access request for a production device;
   obtaining credentials from the client;
   upon verification of the credentials, retrieving an interface from the production device, the interface having user accessible controls for selecting production options for a document;
   presenting the interface to the client;
   placing production data in a queue, the production data representing selected production options and access instructions for the document;
   providing an interface having user accessible controls for managing the production data in the queue; and
   returning production data from the queue to the production device.

12. A computer program product for mediating access to production devices, the product comprising a computer useable medium having computer readable instructions thereon for:
   acquiring an access request for a production device;
   retrieving an interface from the production device, the interface having user accessible controls for selecting production options for a document;
   presenting the interface to a client; and
   returning production data to the production device, the production data including production options selected through the interface and instructions for accessing the document.

13. The product of claim 12, wherein the instructions for acquiring include instructions for intercepting an access request directed to the production device.

14. The product of claim 12, wherein instructions for acquiring include instructions for acquiring a redirected access request.

15. The product of claim 12, wherein the instructions for retrieving and presenting comprise instructions for retrieving and presenting from a device other than the production device.

16. The product of claim 12, comprising further instructions for placing the production data in a queue, and wherein the instructions for returning comprise instructions for returning the production data from the queue.

17. The product of claim 16, further comprising instructions for providing an interface having user accessible controls for managing production data in the queue.

18. The product of claim 12, further comprising instructions for providing an interface having controls for displaying the status of the production device.

19. The product of claim 12, comprising further instructions for obtaining and verifying credentials and wherein the instructions for presenting comprise instructions for presenting the interface only upon verification of the credentials.

20. The product of claim 19, wherein the client is a web browser and the instructions for obtaining comprise instructions for obtaining the credentials using a cookie provided by the web browser.

21. The product of claim 12, wherein the instructions for retrieving comprises instructions for retrieving the interface in the form of a web page and the instructions for presenting comprises instructions for presenting the web page to a web browser.

22. A computer program product for mediating access to production devices, the product comprising a computer useable medium having computer readable instructions thereon for:
   receiving a client's access request for a production device;
   obtaining credentials from the client;
   upon verification of the credentials, retrieving an interface from the production device, the interface having user accessible controls for selecting production options for a document;
   presenting the interface to the client;
   placing production data in a queue, the production data representing selected production options and access instructions for the document;
   providing an interface having user accessible controls for managing the production data in the queue; and
   returning production data from the queue to the production device.

23. In a computer network, a system for managing electronic document production, the system comprising:
   one or more production devices;
   a client operable to identify a target document, issue an access request for a selected production device, and select production options; and
   a mediation service in electronic communication with the client and the production device or devices, the mediation service operable to acquire the access request for the selected production device; retrieve an interface from the selected production device, the interface having user accessible controls for selecting production options for the target document; present the interface to the client; and return selected production options with access instructions for the target document to the selected production device.

24. The system of claim 23 wherein the interface is a web page and the client is a web browser.

25. The system of claim 23, wherein the mediation service includes:
   an interface conduit operable to mediate communication between the client and the selected production device; and
   a production engine operable to manage the return of the selected production options end access instructions for the target document to the selected production device.

26. The system of claim 23, wherein the mediation service includes a permission engine operable to limit the mediation service to returning the interface to a client presenting verified credentials.

27. The system of claim 25, wherein the production engine includes:
   a queue operable to provide a holding bin for the returned production options and access instructions;
   a production manager operable to manage the queue; and
   an interface generator operable to provide the client with an interface having user accessible controls for directing the production manager.

28. The system of claim 27, wherein the interface generator is a web server and the interface the web server provides is a web page having a network address accessible by a web browser.

29. In a computer network, a system for managing electronic document production, the system comprising:
   one or more production devices;
   a client operable to identify a target document, issue an access request for a selected production device, and select production options;
   an interface conduit operable to mediate communication between the client and the selected production device;
   a permission engine operable to limit the mediation service to returning the interface to a client presenting verified credentials;
   a queue operable to provide a holding bin for the returned production options and access instructions for a target document;
   a production manager operable to manage the queue to release production data to a selected production device, the production data including returned production options and access instructions for a target document; and
   an interface generator operable to provide the client with an interface having user accessible controls for directing the production manager.

* * * * *